3,406,206
FORMALDEHYDE SOLUTIONS STABILIZED WITH
VINYL ACETATE POLYMERS
Frederic J. Locke, East Longmeadow, Mass., assignor to Monsanto Company, St. Louis, Mo., a corporation of Delaware
No Drawing. Filed Jan. 21, 1965, Ser. No. 427,135
5 Claims. (Cl. 260—606)

ABSTRACT OF THE DISCLOSURE

The invention provides concentrated solutions of formaldehyde stabilized against polymerization with or without the use of conventional organic solvents. The novel stabilizers used are all non-colloidal polymers having a weight average molecular weight of from about 800 to 10,000 and are selected from the group consisting of polyvinyl acetate, vinyl acetate-allyl or methallyl alcohol copolymers, vinyl acetate-alkyl acrylate copolymers and vinyl acetate-dialkyl fumarate copolymers.

---

This invention relates to formaldehyde solutions and in particular to the stabilization of aqueous solutions of formaldehyde.

Aqueous solutions of formaldehyde are well-known in the art and various additives have been employed in an attempt to prepare and provide stabilized concentrated solutions of formaldehyde. Currently, when employing 37% solutions of formaldehyde in water, generally no stabilizer is necessary since at this concentration little or no formation of para-formaldehyde occurs. When preparing aqueous solutions of formaldehyde in excess of 37% such as 50% solutions of formaldehyde in water, it is necessary to keep the solution at a temperature of over 60° C. in order to prevent formation of para-formaldehyde. Even then the life of the solution is still somewhat limited to the matter of hours. Various stabilizers have been proposed and used to prepare concentrated solutions. One common stabilizer that is well-known is methanol. However, the actual concentration of formaldehyde is still limited with methanol and if greater quantities of methanol are employed to provide higher concentrations of the formaldehyde in water, the methanol is detrimental to the preparation of satisfactory formaldehyde type thermosetting resins. Other stabilizers have been proposed but again the quantities necessary are quite large and have an adverse effect on their use in preparing thermosetting condensation resins such as phenol-formaldehyde, melamine-formaldehyde and urea-formaldehyde resins. Recently a new stabilizer was discovered which was found to be effective in stabilizing solutions of formaldehyde in water in concentrations of from 30–80% (U.S. Patent 3,137,736). The stabilizers so discovered were high polymer colloids having very high viscosities. For example, 2% of the particular high polymer in water had a viscosity of 3000–5000 centipoises. Such highly viscous materials are difficult to handle and present problems in attempting to meter such highly viscous high polymers into formaldehyde solutions.

It has been surprisingly discovered that certain low molecular weight organic non-colloidal compounds possess the very excellent property of stabilizing aqueous formaldehyde solutions of high concentrations with unusually excellent stabilizing effects.

It is an object of this invention to provide a concentrated stabilized aqueous formaldehyde solution.

Another object of this invention is to provide stabilized concentrated aqueous solutions of formaldehyde containing minor amounts of an organic solvent.

Other objects of this invention will in part be obvious and will in part be set out and appear hereinafter.

Briefly, the above and other objects of this invention, including the advantages thereof, are attained by dissolving 1–100 parts per million of a low molecular weight non-colloidal polymer in aqueous solutions of formaldehyde. The aqueous solutions stabilized with this particular polymer contain 38–80 weight percent of formaldehyde in water. The particular low molecular weight non-colloidal polymers have a weight average molecular weight range of from about 800 to about 10,000. It is of particular interest that the formaldehyde solutions so prepared have greater utility when such solutions have a concentration of about 50% of formaldehyde in water.

The following examples are set forth to illustrate more clearly the principles and practices of this invention to one skilled in the art and they are not intended to be restrictive but merely to be illustrative of the invention herein contained. Unless otherwise stated all parts and percentages are on a weight basis.

Example I

To a 50% aqueous formaldehyde solution, 4 parts per million of a vinyl acetate-allyl alcohol copolymer was added based upon the total weight of the solution of formaldehyde and water. The copolymer employed herein had a weight average molecular weight of about 3800 as determined by the intrinsic viscosity measurements in methanol and was about 90% by weight of vinyl acetate and about 10% by weight of allyl alcohol. The specimen was kept at a temperature of 36° C. At the end of 3½ hours, a slight haze was noticed. The haziness is believed to be due to the formation of para-formaldehyde.

As a basis of comparison, a 50% aqueous solution of formaldehyde was also kept at a temperature of 36° C. This specimen had no stabilizer added to the solution. The sample was placed in the oven at a control temperature of 36° C. and at the end of about 75 minutes, a haziness began to form which was again due to the formation of para-formaldehyde.

Example II

Example I was repeated except that in place of the vinyl acetate-allyl alcohol copolymer, an unhydrolyzed polyvinyl acetate polymer was employed having a weight average molecular weight of about 4500 as determined by intrinsic viscosity measurements in methanol. The results obtained were essentially the same as those in Example I.

Example III

Example II was repeated except that 1 and 8 parts per million of the unhydrolyzed polyvinyl acetate were employed instead of the 4 parts per million. Again the results obtained were essentially the same as in Example II.

Example IV

To a 50% aqueous solution of formaldehyde, 4 parts per million of an unhydrolyzed polyvinyl acetate polymer was added having a weight average molecular weight of about 4500 as determined by intrinsic viscosity measurements in methanol. The solution was kept at a temperature of 50° C. As a comparison, a 50% aqueous solution of formaldehyde was also run which solution did not contain polyvinyl acetate. At the end of approximately 10 days, the 50% aqueous solution of formaldehyde containing no polyvinyl acetate was noted to form a haziness. The 50% aqueous solution of formaldehyde containing the 4 parts per million of the unhydrolyzed polyvinyl acetate polymer was still clear at the end of 6 weeks.

Example V

To a 40% aqueous solution of formaldehyde, 5 parts per million of an unhydrolyzed polyvinyl acetate polymer having a weight average molecular weight of about 4500 as determined by intrinsic viscosity measurements in methanol was added and stored at a temperature of about 30° C. At the end of 6 weeks no precipitation or haziness was observed.

Example VI

To a 50% aqueous solution of formaldehyde, 100 parts per million of an unhydrolyzed polyvinyl acetate polymer having a weight average molecular weight of about 4500 as determined by intrinsic viscosity measurements in methanol was added. The sample was kept at 36° C. and at the end of 12 hours a slight haze began to form.

The instant invention is directed to a stabilized solution of formaldehyde in water and in particular to highly concentrated solutions of formaldehyde in water. More particularly, the invention is a stabilized solution of 38–80 weight percent of formaldehyde in water which solution has included therein 1–100 parts per million of a low molecular weight non-colloidal polymer having a weight average molecular weight of from about 800–10,000.

In the practice of this invention as stated previously, the amount of stabilizer to be employed in stabilizing 38–80 weight percent of formaldehyde in water solutions ranges from 1–100 parts per million based on the total weight of the formaldehyde and water solution. Preferably, the amount to be employed will vary depending upon the particular stabilizer. This will preferably range from about 4–25 parts per million. For example, when using polyvinyl acetate containing no hydrolysis, the amount of polyvinyl acetate necessary to provide a stabilized solution can range from 4–12 parts per million. When employing a hydrolyzed polyvinyl acetate polymer having up to 50% hydrolysis, the amount of the hydrolyzed polyvinyl acetate polymer necessary in order to achieve satisfactory stabilization will vary upwards to 25 parts per million and even higher. As shown in the examples, as little as 1 part per million of the stabilizer of this invention will produce satisfactory stabilized solutions of formaldehyde in water. In some cases it may be necessary to achieve longer periods of stability and this can be accomplished by merely increasing the amount of stabilizer. This is shown by Example VI wherein 100 parts per million of unhydrolyzed polyvinyl acetate polymer stabilized a solution of 50% formaldehyde in water up to 12 hours at 36° C.

The particular polymers employed in stabilizing the formaldehyde in water are specifically polyvinyl acetate with up to 50% hydrolysis, vinyl acetate-allyl alcohol copolymers, vinyl acetate-methallyl alcohol copolymers, vinyl acetate-alkyl acrylate copolymers and vinyl acetate-dialkyl fumarates and mixtures thereof. The alkyl radicals of the above contain 1–6 carbon atoms. It is these specific materials that are suitable as stabilizers for concentrated solutions of formaldehyde in water. The limitation of up to 50% hydrolysis of the polyvinyl acetate is necessary since when employing more than a 50% hydrolyzed polyvinyl acetate polymer, the polymer does not act efficiently as a stabilizer and would require, if at all, a greater amount than the maximum of 100 parts per million. The vinyl acetate copolymers employed in the practice of this invention should preferably contain at least 50 mol percent of vinyl acetate.

The stabilizers of this invention can be added directly to the formaldehyde aqueous solutions since these polymers are soluble in the formaldehyde while being essentially insoluble in the aqueous phase thereof. Since it may be necessary, however, to meter the stabilizer into the formaldehyde aqueous solution, it is feasible to dissolve the stabilizer in an organic solvent and then to meter this material into the aqueous formaldehyde solution. In the practice of this invention, when dissolving the stabilizer in an organic solvent, any of the well-known conventional organic solvents may be used providing that they do not interfere with the stabilization of the formaldehyde solution or that they have no adverse effects on formaldehyde type resins prepared employing the stabilized formaldehyde solution of this invention. Specifically, the organic solvents can be methyl alcohol, ethyl alcohol, acetone and methyl acetate. If it is desirable to use an organic solvent, the preferred organic solvent to be employed herein is methyl alcohol and the amount is preferably such that the stabilized aqueous formaldehyde solution will contain less than 5 weight percent based on the weight of the total solution and preferably less than 0.1 weight percent thereof. In fact, when using any of the organic solvents the total formaldehyde in water solution containing the stabilizer should contain less than 5 weight percent thereof of the organic solvent.

The concentrated aqueous formaldehyde solutions of this invention can be used for the same purpose as any of the same conventional aqueous formaldehyde solutions. For example, they are suitable in preparing phenol-formaldehyde, melamine-formaldehyde and urea-formaldehyde resins. In fact, it is desirable to use the highly concentrated formaldehyde solutions since as such they introduce less water into the reaction than the conventional 37% aqueous formaldehyde solutions.

It will thus be seen that the objects set forth above among those made apparent from the preceding description are efficiently attained and since certain changes may be made in carrying out the above process and in the composition set forth without departing from the scope of this invention it is intended that all matters contained in the above description shall be interpreted as illustrative and not in a limiting sense.

What is claimed is:

1. A stabilized solution which consists essentially of 38–80 weight percent of formaldehyde in water and 1 to 100 p.p.m. of a non-colloidal polymer having a weight average molecular weight of from about 800–10,000 and being selected from the group consisting of polyvinyl acetate, vinyl acetate-allyl alcohol copolymers, vinyl acetate-methallyl alcohol copolymers, vinyl acetate-alkyl acrylate copolymers wherein the alkyl radical contains 1–6 carbon atoms and vinyl acetate-dialkyl fumarate copolymers wherein the alkyl radical contains 1–6 carbon atoms, and mixtures thereof.

2. The stabilized solution of claim 1 wherein the solution contains less than 5 weight percent of an organic solvent.

3. The stabilized solution of claim 2 wherein the organic solvent is selected from the group consisting of methyl alcohol, ethyl alcohol, acetone and methyl acetate.

4. The stabilized solution of claim 1 wherein the non-colloidal polymer is a polyvinyl acetate polymer.

5. The stabilized solution of claim 4 containing 1–20 p.p.m. of the polyvinyl acetate polymer.

References Cited

FOREIGN PATENTS 968,762   9/1964   Great Britain.

MURRAY TILLMAN, *Primary Examiner.*

W. J. BRIGGS, SR., *Assistant Examiner.*